(12) United States Patent
Newman et al.

(10) Patent No.: US 8,265,116 B2
(45) Date of Patent: Sep. 11, 2012

(54) HERMETICALLY-SEALED RF FEED-THROUGH WITH INTEGRATED CAPACITOR

(75) Inventors: Leon A. Newman, Glastonbury, CT (US); Vernon A. Seguin, Windsor, CT (US); Lanny Laughman, Bolton, CT (US); Adrian Papanide, Shelton, CT (US)

(73) Assignee: Coherent, Inc., Santa Clara, CA (US)

( * ) Notice: Subject to any disclaimer, the term of this patent is extended or adjusted under 35 U.S.C. 154(b) by 268 days.

(21) Appl. No.: 12/481,460

(22) Filed: Jun. 9, 2009

(65) Prior Publication Data
US 2010/0118901 A1 May 13, 2010

Related U.S. Application Data

(60) Provisional application No. 61/114,333, filed on Nov. 13, 2008.

(51) Int. Cl.
*H01S 3/22* (2006.01)
(52) U.S. Cl. ............... 372/55; 372/35; 372/61; 372/63; 372/65

(58) Field of Classification Search ............... 372/55, 372/61, 63, 65, 35; 257/698
See application file for complete search history.

(56) References Cited

U.S. PATENT DOCUMENTS

| | | | |
|---|---|---|---|
| 6,603,794 B2 * | 8/2003 | Bethel et al. | 372/98 |
| 2002/0071466 A1 * | 6/2002 | Zeller | 372/55 |
| 2003/0058913 A1 * | 3/2003 | Shackleton et al. | 372/55 |
| 2008/0205473 A1 | 8/2008 | Shackleton et al. | |
| 2009/0004918 A1 | 1/2009 | Papanide et al. | |

* cited by examiner

*Primary Examiner* — Yuanda Zhang
(74) *Attorney, Agent, or Firm* — Morrison & Foerster LLP

(57) ABSTRACT

A carbon-dioxide ($CO_2$) gas-discharge slab laser includes elongated discharge-electrodes in a sealed enclosure. Radio Frequency (RF) power is supplied to the electrodes via an impedance matching network and a co-axial electrical low inductance transmission line feed-through sealed to the enclosure. The feed-trough includes two spring contacts which are configured to be spring compression push-fit in grooves in edges of the discharge-electrodes. A central conductor of the feed-through is fluid cooled. A capacitor of the impedance matching network is assembled on the central conductor as an integral part of the feed-trough.

10 Claims, 8 Drawing Sheets

HERMETICALLY-SEALED RF FEED-THROUGH WITH INTEGRATED CAPACITOR

PRIORITY CLAIM

This application claims priority of U.S. Provisional Patent Application No. 61/114,333, filed Nov. 13, 2008, the complete disclosure of which is hereby incorporated herein by reference.

TECHNICAL FIELD OF THE INVENTION

The present invention relates in general to carbon dioxide ($CO_2$), radio frequency (RF) excited gas discharge lasers. The invention relates in particular to providing RF power from an RF power supply through a hermetic sealed feed-through discharge-electrodes within a sealed off laser chamber including a lasing gas mixture.

DISCUSSION OF BACKGROUND ART

FIG. 1 is an electrical schematic drawing depicting a prior-art arrangement 10 of an (RF) excited gas discharge laser. The arrangement includes an RF power supply 12, an impedance matching network 14 and a sealed laser housing 16 including discharge-electrodes 28 and 30 and a laser gas mixture. An RF feed-through 22 (in electrical schematic form) for conducting RF power into the laser housing is outlined by a dashed line, as the feed-through from its function can be considered as being both within and without the laser enclosure. The feed-through has a center conductor 24 passing coaxially through a feed-through body 26 which is grounded. The center conductor is the live or "hot" conductor and is connected within the laser enclosure to the hot electrode 28. The feed-through body is connected to the ground electrode 30 and is grounded to the enclosure. All enclosures are RF shielded and grounded.

In an RF power supply the output from a plurality of RF amplifiers is connected via coaxial leads 18 to a common point 19. The RF power is transmitted from point 19 into the impedance matching network via short coaxial structure 20. The ratio of the diameter of a center conductor of the coaxial structure and the inside diameter of the outer conductor are chosen such that the coaxial structure has an impedance as $Z_p$ to match the output impedance of the power supply. The impedance matching network includes two L-shaped networks, one thereof including an inductor $L_1$ and a capacitor $C_1$, the other including an inductor $L_2$ and capacitor $C_2$. The $L_1$-$C_1$ network increases the impedance from $Z_P$ at structure 20 to $Z_N$ at point 21 where the inductor and capacitor are connected. The $L_2$-$C_2$ network matches impedance $Z_N$ to the load impedance of the laser $Z_L$.

Certain problems were encountered in configuring and using an example of an arrangement such as arrangement 10 for a laser having an average power output of about 1 kilowatt (kW) or greater necessitating an RF power input of about 10 kW or greater. The RF feed-through selected was of a type described in U.S. patent application Ser. No. 12/069,939 (U.S. Pre-Grant publication No. 2008/0205473), filed Feb. 14, 2008 assigned to the assignee of the present invention, and the complete disclosure of which is hereby incorporated by reference. This feed-through had previously been successfully used for a $CO_2$ laser having an average output power up 500 Watts (W).

One problem encountered in the higher power laser was that it was difficult to realize practical values for the inductor $L_2$, capacitor $C_1$ and especially for capacitor $C_2$, to match to the low impedance of the laser discharge impedance $Z_L$, and also provide components small enough to fit within an RF shielded enclosure of convenient dimensions. Another problem was that large RF currents flowing within the electrically hot central conductor of the feed-through generated excessive heating in the feed-through which caused problems in using rubber of indium vacuum seals. Yet another problem was that corona discharge occurred between connections from the feed-through to the electrodes within the laser housing. At an RF power level of 20 kW, arcing occurred between metal plates of capacitor $C_2$. There is need to solve these problems in order to provide reliable sealed-off $CO_2$ lasers having an average power of 1 kW or greater.

SUMMARY OF THE INVENTION

In one aspect of the present invention, gas discharge laser apparatus comprises first and second spaced-apart parallel discharge-electrodes in a laser enclosure. The first discharge electrode serves as a live discharge-electrode and the second electrode serves as a ground discharge-electrode. A radio frequency (RF) feed-through is provided for transmitting RF power from without the enclosure to the first and second discharge-electrodes within the enclosure, each of the discharge electrodes has a groove in an edge thereof facing the RF feed-through. The RF feed-through includes first and second springably compressible connecting members on a side thereof within the enclosure and attached respectively to a live electrode and a ground connection of the feed-through. The connection members and the discharge-electrode grooves are cooperatively configured such that the first and second connection members can be compressed to a push-fit into the grooves in respectively the first and second discharge-electrodes and retained in electrical contact with the electrodes by the spring compression of the connection members against sides of the grooves.

In another aspect of the present invention, the electrical feed-through has a hollow, metal feed-through body having first and second opposite ends, the first end intended to be without the enclosure and the second end intended to be within the enclosure. A plate of an insulating material closes the second end of the feed-through body. The live electrode of the feed-through extends through the feed-through body and through an aperture in the insulating-material plate. An arrangement is provided for flowing a coolant fluid within the live electrode.

In yet another aspect of the present invention, the RF-power is supplied to the feed-through via an impedance matching network including at least one capacitor. The capacitor is assembled on the end of the feed-through without the enclosure as an integral part of the feed-through.

BRIEF DESCRIPTION OF THE DRAWINGS

The accompanying drawings, which are incorporated in and constitute a part of the specification, schematically illustrate a preferred embodiment of the present invention, and together with the general description given above and the detailed description of the preferred embodiment given below, serve to explain principles of the present invention.

DETAILED DESCRIPTION OF THE INVENTION

Figure 2:
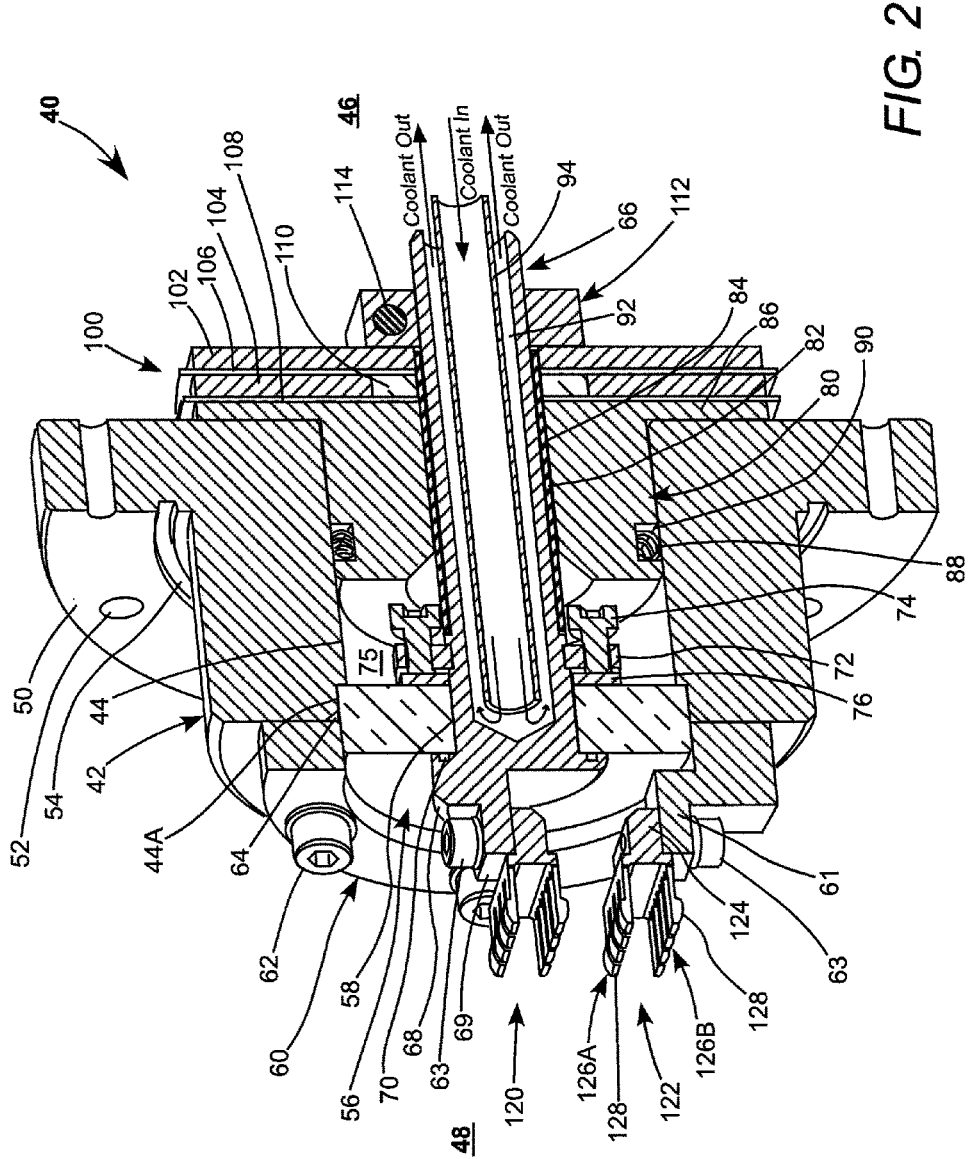
FIG. 2 is an isometric view, partly in cross-section, schematically illustrating one preferred embodiment of an RF feed-through in accordance with the present invention suitable for use in a laser arrangement similar to the laser arrangement of FIG. 1, the feed-through having a feed-through body including a flanged portion and a hollow cylindrical portion in a single piece and having an insulating disc at one end of the cylindrical portion through which a fluid-cooled central electrode extends, the cylindrical body and the electrode furnished with electrical connectors designed to provide spring push-fit into grooves provided in the discharge electrodes, and a capacitor of the impedance matching network assembled on the electrode at the flange-end of the feed through body.
Figure 2A:
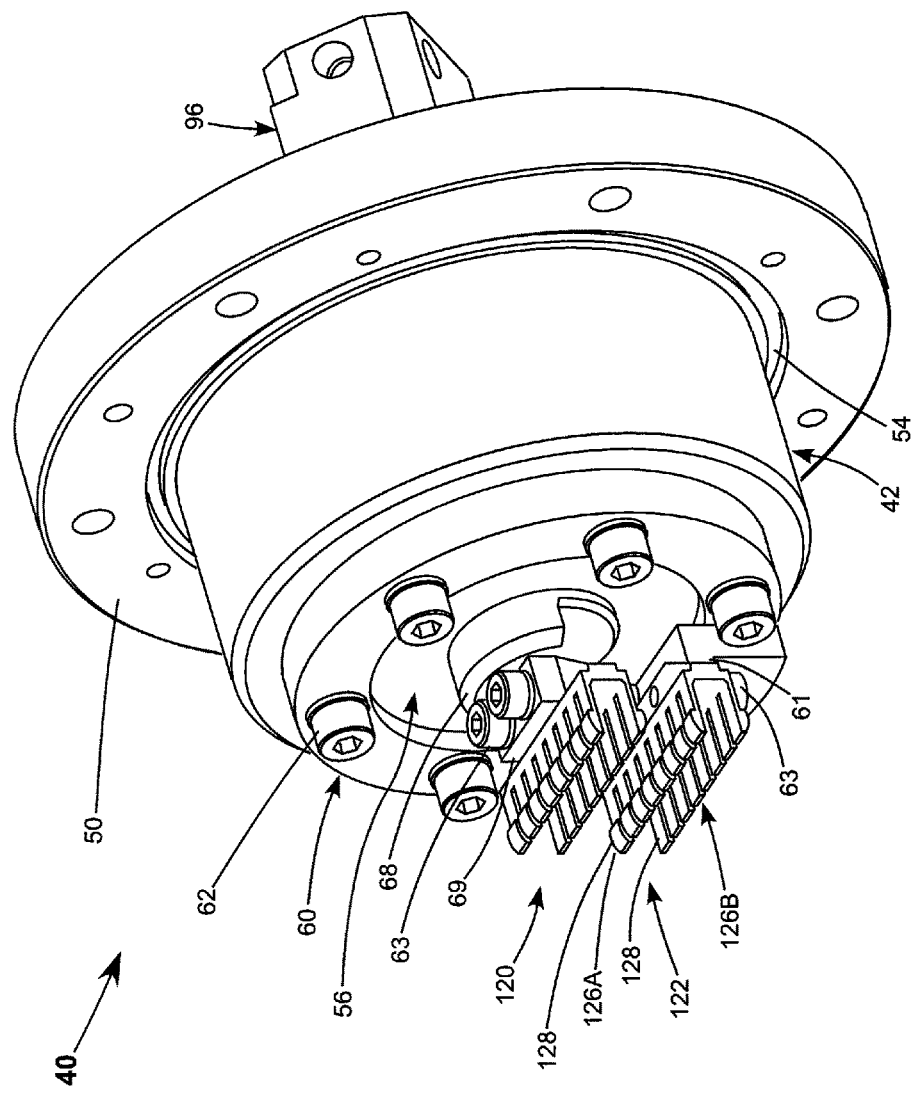
FIG. 2A is an isometric view from the front of the feed-through of FIG. 2, schematically illustrating further detail of the push-fit connectors.
Figure 2B:
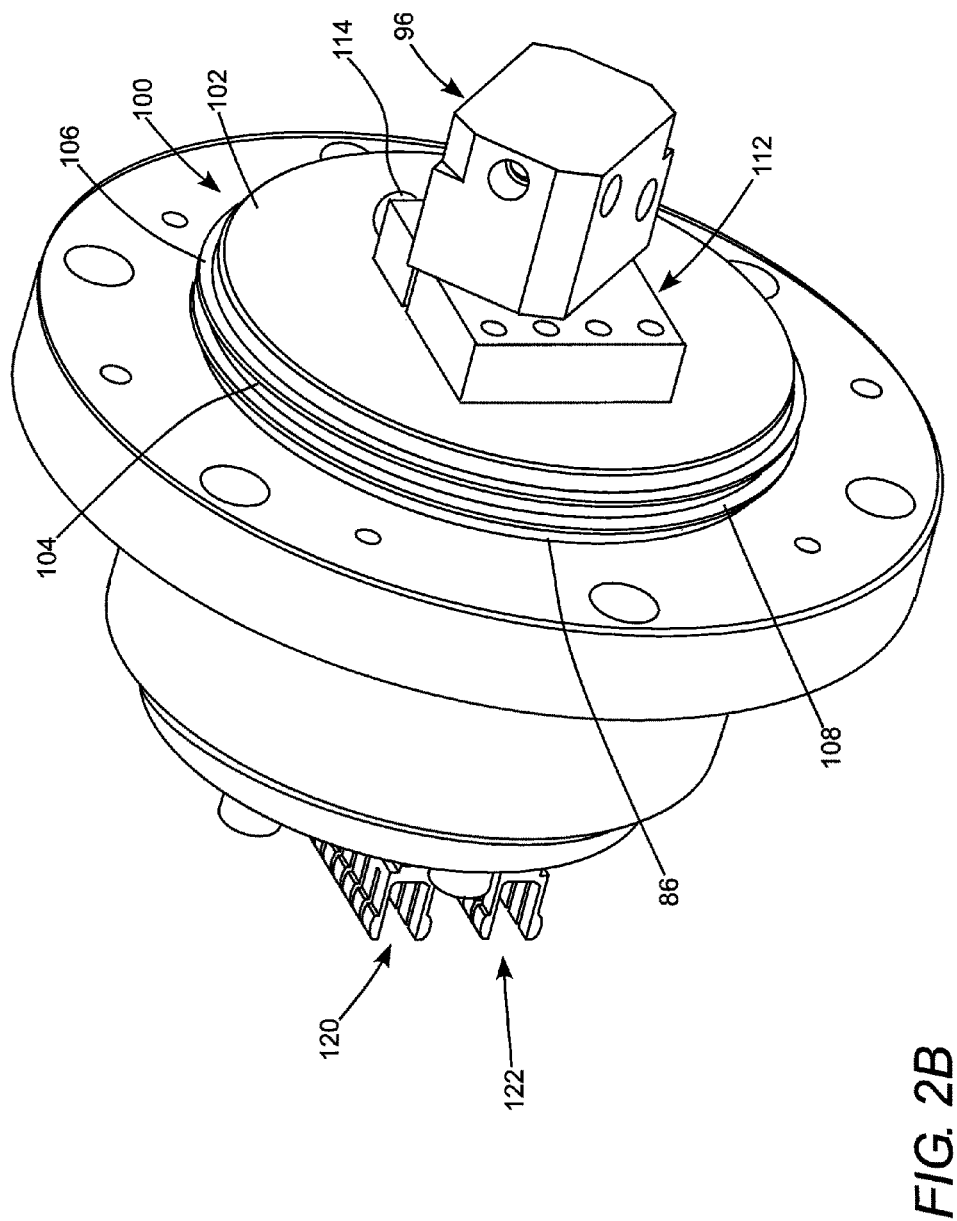
FIG. 2B is an isometric view from the rear of the feed-through of FIG. 2, schematically illustrating a coolant fluid manifold for the fluid-cooled electrode and further detail of the integral capacitor.
Figure 2C:
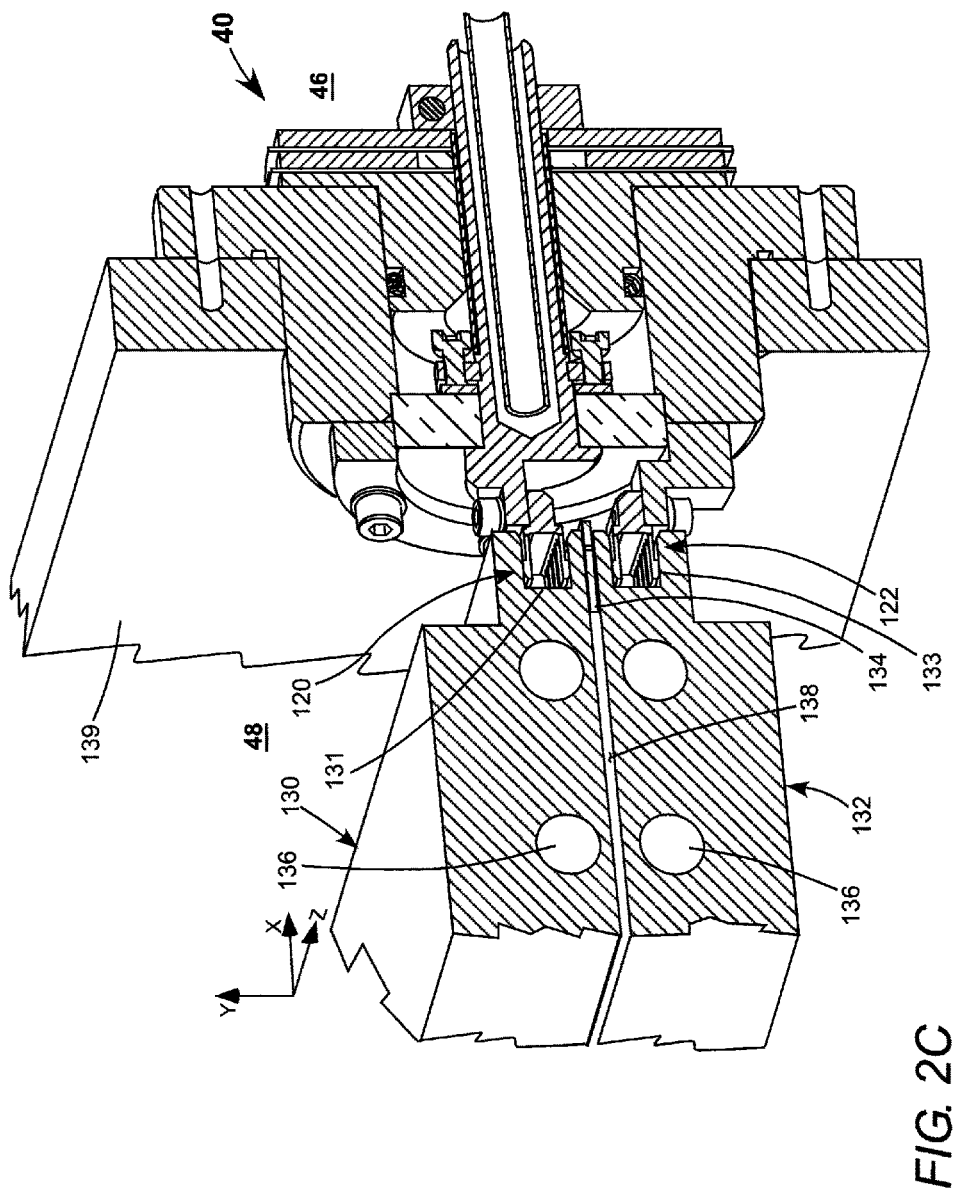
FIG. 2C is an isometric view, partly in cross-section, schematically illustrating details of the attachment of the feed-though to an enclosure wall, and details of the push fit of the connectors into the electrodes.

Referring now to the drawings, wherein like components are designated by like reference numerals, FIG. 2 schematically illustrates one preferred embodiment 40 of an RF feed-through in accordance with the present invention. Reference is made in addition to FIGS. 2A-2C which depict the inventive feed-through from other viewpoints.

Feed-through 40 has a body 42, preferably of aluminum having a cylindrical aperture 44 extending therethrough for an atmospheric-pressure side 46 to a low pressure (laser enclosure interior) side 48 of the feed-through. Body 42 has a flange 50 for sealing the low pressure 48 side from the atmospheric-pressure side 46. In use, all of the feed-though body except for flange 50 will be in the laser enclosure. The body is clamped to a side-wall of the enclosure by screws (not shown) extending through holes 52 in the flange with sealing of the body to the enclosure being effected by clamping pressure bearing on an C-metal seal (not shown) in a groove 54 in flange 50.

A ceramic insulator disc 56, having an aperture 58 extending therethrough, is seated in a shallow, circumferentially-recessed portion 44A of aperture 44 at the low-pressure end of body 42. A clamping ring or ground-ring 60, preferably of aluminum, is clamped to the low pressure end of body 42 by screws 62. The clamping force bears on and distorts a sealing ring (not shown) in a circumferential, sloping-sided recess 64 of body 42. This forces the sealing ring onto the edge of ceramic disc thereby sealing the disc to body 42 in one step. It is recommended that the edge of disc 56 be polished to optimize the seal.

An elongated central, electrically hot, electrode 66 extends through aperture 58 in ceramic disc 66 and out of the atmospheric-pressure end 46 of body 42. A flanged portion 68 on the low-pressure end of electrode 66 has a sealing ring (not shown) in a groove 70 in the flanged portion. A retaining ring 72, preferably of brass, is seated in a circumferential groove (shown but not numerically designated) in electrode 66 on the opposite side of disc 56 to electrode flange 68. Screws 74 extend through threaded holes in retaining ring 72 and bear on a flat washer 76, preferably of copper, against disc 56. Screws 74 are tightened to compresses the seal (not shown) in groove 70 of flange 68 of the hot electrode. This completes the seal of the disc to feed-through body 42.

Screws 74 are contained within an air cavity 75 whose sides are formed by the ceramic disc 56 and metal plug 80, preferably of aluminum, inserted into the atmospheric press end of aperture 44 of body 42. Hot electrode 66 extends though a Teflon insulating sleeve 82 extending in turn through an aperture 84 in plug 80.

The combination hot electrode lead 66 and plug 80 can be considered as a sort of re-entry type transmission line. The thinner sleeve 82 separating the hot electrode 66 lead and plug 80, the smaller is the series inductance (reactance) presented by the re-entry type transmission line. The sleeve of course must be thick enough to provide effective electrical insulation without suffering breakdown. A preferred thickness for this sleeve is about 0.30 inches.

In the above described arrangement of FIG. 2 the inductance is comparable to, or lower than the impedance presented by the discharge between the discharge electrodes when the laser is operating. This allows the inventive feed-through to be smaller, more reliable, and more efficient than a prior-art RF feed-through.

The discharge impedance of a 1000 W $CO_2$ laser can be less than a few Ohms. The use of this re-entry transmission line design resulted in the reduction of the series inductance from about 25 nano-Henrys in a prior art design to about 10 nano-Henrys yielding an impedance of about 6.28 Ohms at 100 Mz. This low impedance reduces by two-and one-half times the voltage required at the entrance of the transmission line required to drive the discharge. This lower voltage prevents corona discharges from occurring at the entrance to the transmission line at the atmospheric-pressure side 46 of the laser housing.

A flange portion 86 of plug 80 bears on flange 50 of feed-through body 42 and is clamped against flange 50 by screws (not visible). This provides a reasonably good RF ground for the feed-through body, in addition, of course, to retaining the plug in the body. An additional good RF ground contact is made by a canted spring 88 compressed between the plug and the feed-through body in a circumferential groove 90 in plug 80.

Returning now to a further description of hot (live) electrode 66, the electrode has a hollow interior formed by a bore 92 extending co-axially through the electrode into the portion thereof surrounded by ceramic disc 56. A coolant introduction tube 94 is inserted coaxially within bore 92. The tube is held in alignment by a manifold (not shown in FIG. 2) which fluid-sealed to the electrode and the coolant tube. The manifold is depicted as manifold 96, partially, in FIG. 2A, and, fully, in FIG. 2B. A description of the construction of the manifold is manifold is not necessary for understanding principles of the present invention and is not presented herein.

A coolant fluid, which may be simply water, is flowed into electrode 66 through tube 94 and back out through coaxial space 92 between the coolant tube and the electrode body. This coaxial cooling arrangement is an important feature of the inventive feed-through and has been found to solve the above-discussed overheating problem encountered with a prior-art feed-through at 20 kW RF-power.

Another important feature of the inventive feed-through is an integrated series capacitor arrangement 100. The equivalent of two series-connected capacitors is provided by two copper discs 102 and 104, two thin dielectric plates 106 and 108 and a thicker dielectric plate 110. Holes in the discs allow the discs to be threaded over Teflon sleeve 82 around the electrode body. The discs are clamped in place against flange portion 86 and plug 80 by a pinch clamp 112 in electrical contact with hot electrode. The pinch clamp and capacitor arrangement are partially depicted in FIG. 2 and completely depicted in FIG. 2B. The net value of the series capacitance can be varied, if desired, by providing machined surface recesses (not shown) in the copper plates and selectively rotating them with respect to each other. This technique is described (for stand-alone capacitors) in U.S. patent Application Ser. No. 12/051,232 (Pre-Grant Publication Number 2009/0004918), filed Mar. 19, 2008, assigned to the assignee of the present invention, and the complete disclosure of which is hereby incorporated by reference. In this inventive arrangement of integrated capacitors, minor capacitance adjustments can also be made by adjusting the amount of pressure applied by pinch clamp 112 against plate 102 then locking the clamp using securing screw 114 of the clamp.

Figure 1:
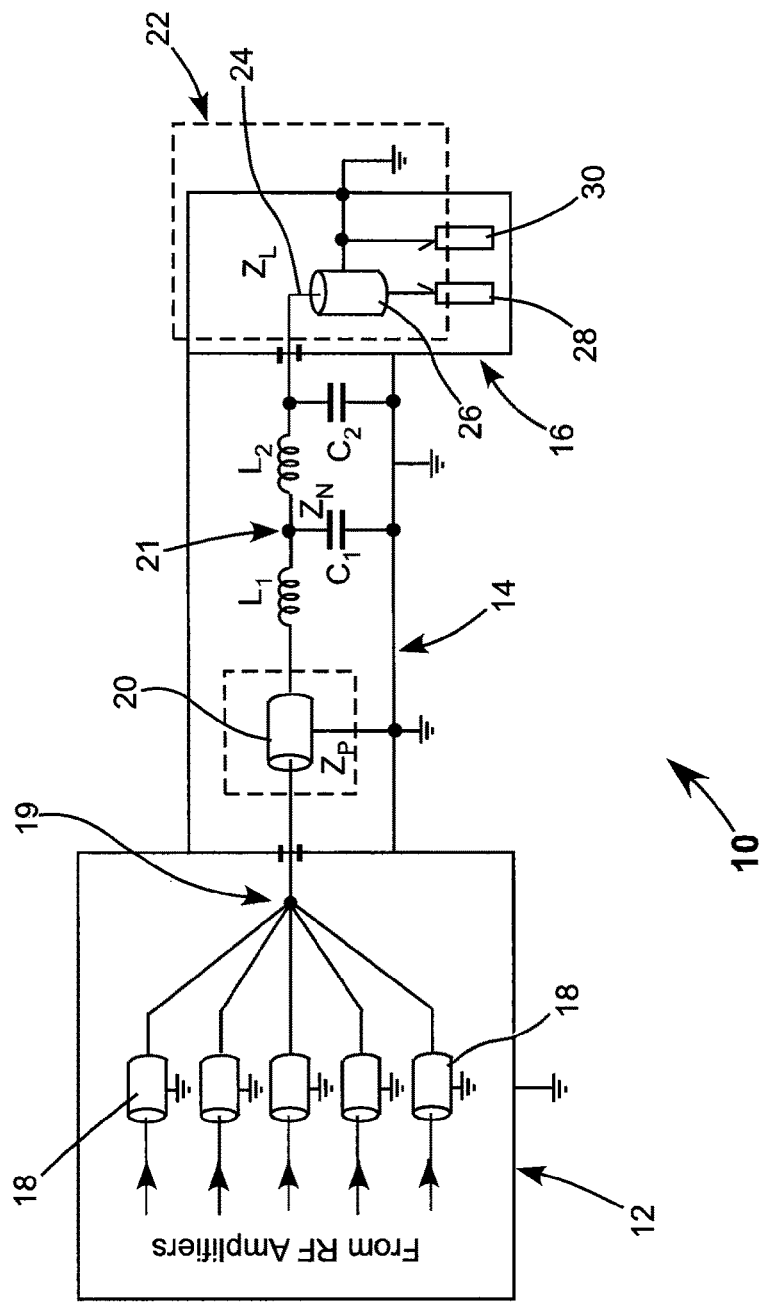
FIG. 1 is an electrical schematic drawing of a prior-art CO2 laser including a laser enclosure containing two discharge-electrodes and an RF feed-through for conducting RF power to the discharge-electrodes, the RF power being supplied to the feed-through via an impedance matching network including two inductors and two capacitors.

The provision of the two capacitors in series reduces the voltage across the individual capacitors which has been found, at 20 kW RF-power into the laser discharge, to solve the above-discussed corona and arcing problem with capacitors in a prior-art impedance-matching network. Further the integrated series capacitor arrangement and an additional capacitance resulting from Teflon sleeve 82 between plug 80 and electrode 66 provide the value of capacitor $C_2$ in the prior-art impedance-matching arrangement of FIG. 1. This eliminates the above-discussed problem of accommodating impedance-matching network components in an enclosure of convenient dimensions.

Continuing with reference to FIG. 2 and with reference in addition to FIG. 2A and FIG. 2C, arrangements for making electrical contact between the inventive feed-through and laser discharge-electrodes include two, here, identical, contacting members 120 and 122. Each contact member includes a base block 124 from which protrude two spaced-apart, parallel rows 126A and 126B of metal-spring fingers 128, preferably of beryllium-copper (Be—Cu). Contact member 120 is attached to a platform 69 extending from flange 68 of hot electrode 66 by screws 63. Contact member 122 is attached by screws 63 to a platform 61 extending from ground ring 60.

FIG. 2C schematically illustrates how the contact members, depicted fully in FIG. 2A, make electrical contact with cooperatively designed discharge-electrodes 130 (the electrically hot electrode) and 132 (the ground electrode). The electrodes are separated by ceramic spacers 134 (only one shown) to define a discharge gap 138 therebetween. Both the hot electrode 130 and the ground electrode 132 have channels 136 therein to allow passage of a cooling fluid. A wall 139 of a sealed laser enclosure for the electrodes is depicted to illustrate the manner in which feed-through 40 is attached to the enclosure. The enclosure itself is represented by space-designation numeral 48.

Those familiar with the $CO_2$ laser art will be aware that the electrodes in practice are elongated electrodes arranged parallel to each other characteristic of electrodes in a slab-laser. Only a sufficient portion of each electrode is shown to allow a drawing having a scale adequate to understandably depict the manner of connecting the electrodes to the inventive feed-through. Only a portion of one enclosure wall 139 is shown as those familiar with the art will be familiar with how laser housings are constructed. Axes X, Y, and Z depict the laser orientation with Z being the propagation axis for the laser beam and X and Y being transverse (free-space and waveguide, respectively) axes.

Electrodes 130 and 132 each include a groove 131/133 along an edge of the electrode. Each groove has a width sufficient to accept spaced-apart spring finger rows 126A and 126B of a contact member in a push fit compressing the spring finger rows toward each other, with spring force of the fingers maintaining electrical contact with the contact member and the electrode. The inventive feed-through is configured such that the Y-axis spacing of the contact members thereon is equal to the Y-axis spacing of the grooves in the electrodes. This contacting arrangement was found to eliminate the above-discussed corona discharge problem around contact electrodes in a prior-art feed-through at 20 kW RF-power.

Figure 3:
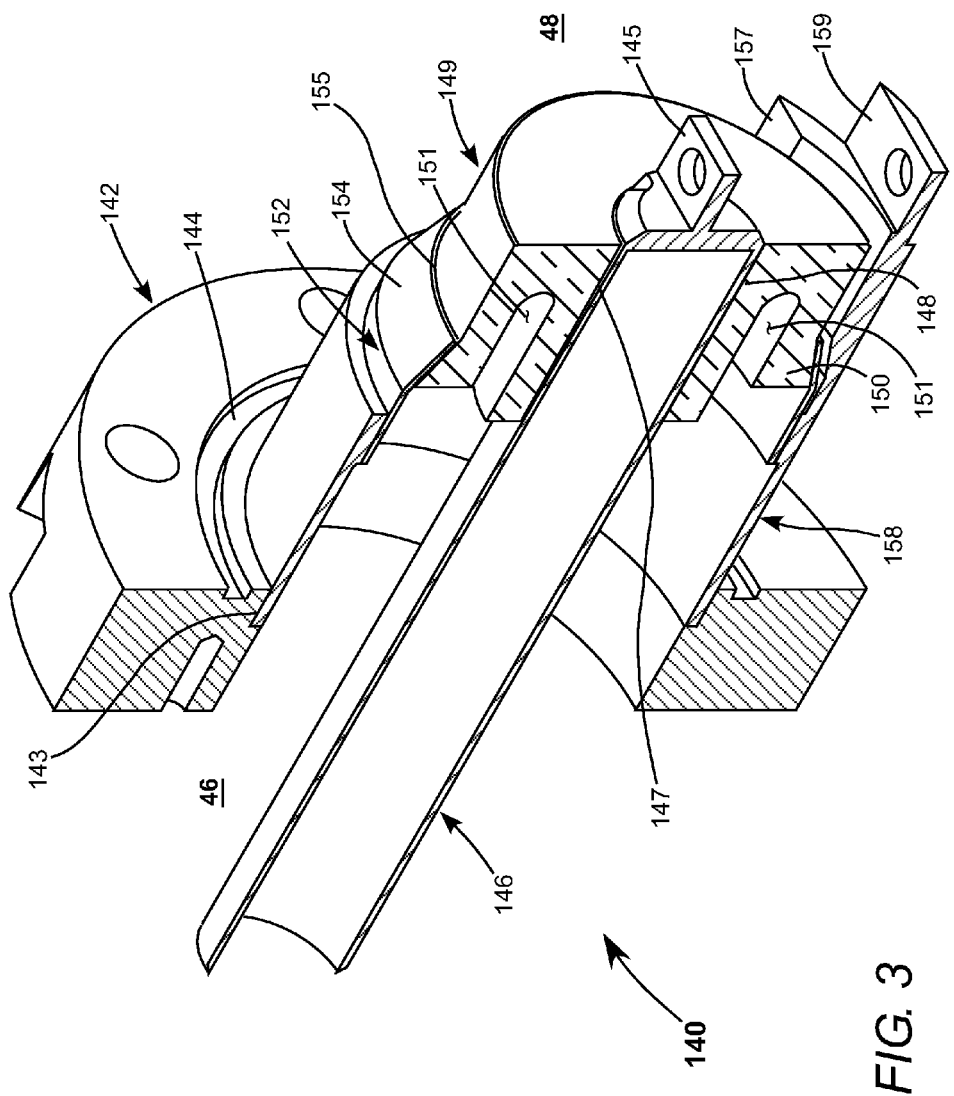
FIG. 3 is an isometric view, partly in cross section, schematically illustrating another preferred embodiment of an RF feed-through in accordance with the present invention, similar to the feed through of FIG. 2 but wherein the feed-through body is assembled from three parts and the insulating disc has a different configuration from that of the feed-through of FIG. 2.
Figure 3A:
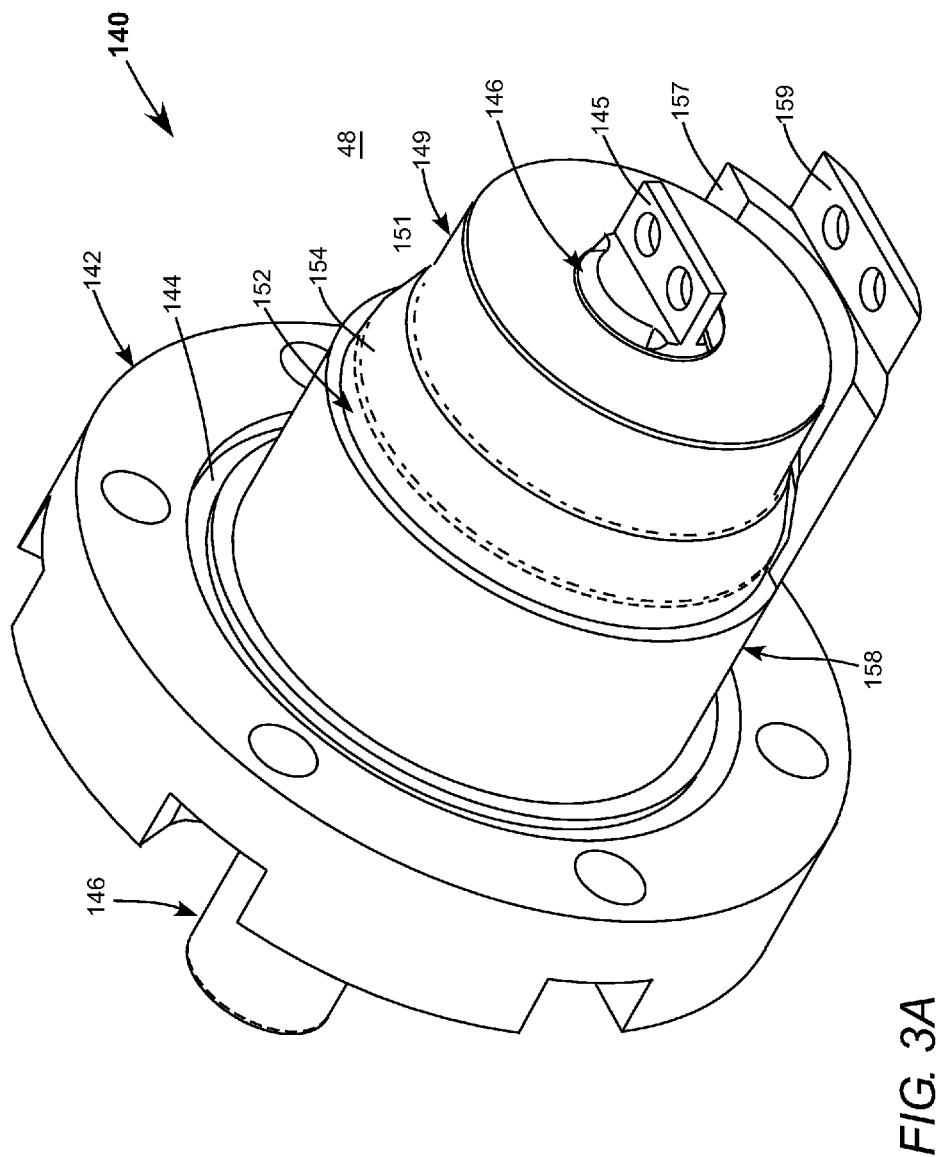
FIG. 3A is an isometric view from the front, schematically illustrating further detail of the feed-through of FIG. 3.

FIG. 3 and FIG. 3A schematically illustrate another preferred embodiment 140 of an RF feed-through in accordance with the present invention. The feed-through is assembled on a flange 142, preferably of stainless steel, and intended for clamping and sealing the feed-through to a wall of a laser enclosure (not shown). Flange 142 has a groove 144 therein for seating an O-ring seal or the like for effecting the feed though-to-enclosure seal.

In FIGS. 3 and 3A only details on the low pressure side 48 of the inventive feed-through are depicted. It is intended that on the atmospheric-pressure side the aluminum plug, capacitor assembly, insulating sleeve, coolant feed tube, pinch clamp, and coolant manifold will be assembled, generally as depicted for feed-through 40 of FIG. 2, with dimension changes where necessary. A description of these components is omitted in FIGS. 3 and 3A to avoid a repetitious description, and for simplicity of illustration. From the detailed description of the components provided above and the detailed description of feed-through 40 provided below, it will be clear to those skilled in the how the atmospheric-pressure side components are assembled to complete feed-through 140.

Feed-through 140 includes a hollow central conductor (electrode) 146, preferably of copper, having an extension 145 brazed thereon, on which it is intended that a connector assembly similar to connector assemblies 120 and 122 of feed-through 40 be mounted. Electrode 146 is inserted through an aperture 148 in a thick ceramic disc 149. The outer surface of electrode 146 is attached permanently, for example by brazing, for a short distance into aperture 148 from the low-pressure side. A distance of about 0.2 inches has been found sufficient for attachment and sealing.

A flared portion 150 of ceramic disc 149 is brazed to a mating tapered portion 154 of a gold-plated copper adaptor tube 152. The adapter tube in turn is brazed into and in electric contact with a gold-plated copper ground-connection tube 158. Tube 158 is brazed into a recess 143 in flange 142. The ground-tube and ground-tube adaptor can be compared to the cylindrical portion of the one-piece body 42 of feed-through 40 of FIG. 2. Tube 158 has an extension on a bottom portion 157 thereof, on which extension is a platform 159 on which it is intended that that a spring finger contact assembly in accordance with the present invention is mounted. The relatively long distance between the ground adaptor tube 152 and platform 157 provides that arcing is avoided in operation.

Ceramic disc 149 has a circular trench 151 machined in the atmospheric-pressure side thereof. The trench 151 being located on the high pressure side serves to reduce the electrical field strength seen on the low pressure side at metal to ceramic brazing interface 155. By minimizing the electric RF field at this metal to dielectric interface, detrimental parasitic discharges in low pressure region are avoided.

Figure 4:
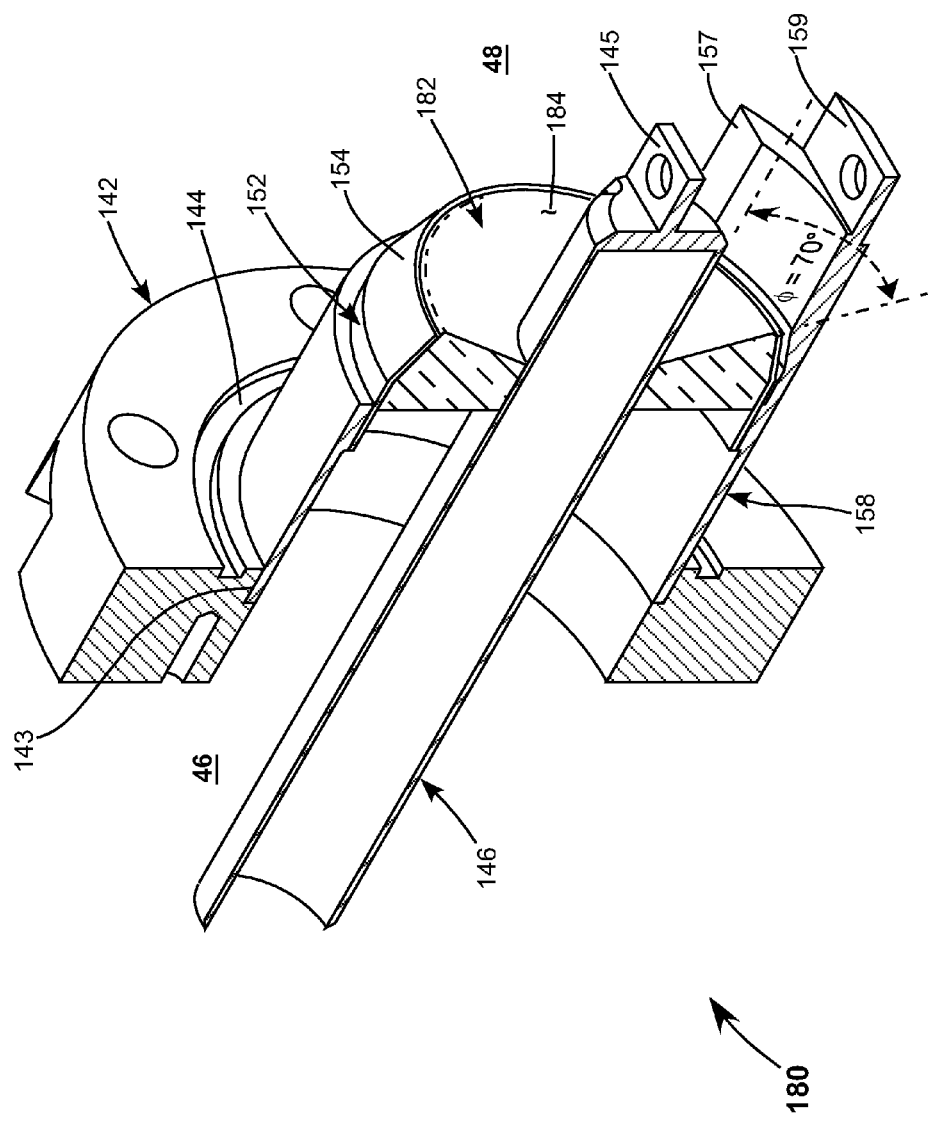
FIG. 4 is an isometric view, partly in cross section, schematically illustrating yet another preferred embodiment of an RF feed-through in accordance with the present invention, similar to the feed through of FIG. 3 but wherein the insulating disc has a simpler configuration from that of the feed-through of FIG. 3.

FIG. 4 schematically illustrates yet another embodiment of an RF feed-through 180 in accordance with the present invention. Feed-through 180 is similar to feed-through 140 of FIG. 3, with an exception that thick, channeled ceramic insulating disc 149 of feed-through 140 is replaced feed-though 180 by a relatively thin ceramic insulating disc 182 not having a machined trench therein. Feed-through 180 is somewhat simpler and less expensive in construction than feed-through 140 due to the simpler configuration of the ceramic insulator, particularly the elimination of the trench. It can be expected, however, that feed-through can not tolerate as high an RF power as above-described feed-through embodiments 40 and 140 before spurious arcing or corona discharges occur.

One advantage of thin ceramic disc 182 is that the length of the space defined at the interface between the ceramic disc and the conductor 146 is reduced compared with that of disc 49 in feed-through 140. This provides for a shorter out-gassing time in manufacture. Out-gassing (by baking under vacuum) for all brazed-together components wherein unfilled spaces may trap impurities is recommended. If not eliminated by the out-gassing these impurities could eventually find passage into the laser housing and potentially contaminate the laser gas mixture and shorten the sealed-off lifetime of the laser.

In ceramic disc 182 it is preferable that surface 184 on the low-pressure side thereof is machined into an inverse-conical shape as depicted in FIG. 4. Preferably the surface is machined such the angle (p between the surface and the surface of electrode 146 is about 70°. This inverse conical surface provides a longer surface pathway along the ceramic, spreading electric field lines between tapered portion 154 of ground adaptor tube 152 and thereby reducing electric field intensity at the surface junctions between the ceramic disc, the ground adaptor tube and the central conductor (electrode) 146.

It should be noted here that while preferred materials and attachment methods are discussed above with reference to embodiments of the present invention, these materials and techniques should not be considered limiting. Those skilled in the art may substitute other materials and methods without departing from the spirit and scope of the present invention. Regarding exemplary dimensions it is contemplated that all above described embodiments of the inventive feed-through, designed for operation up to 20 kW RF power, be assembled on a flange, such as flanges 50 of feed-through 40, and flange 142 of feed-through 140 and feed-through 180, having a diameter of about 2.65 inches. As drawings of embodiments of the invention are isometric projections, with components depicted being relatively to scale, dimensions of other components can readily be estimated. Here again, those skilled in the art may reproduce above-described embodiments with different absolute and relative dimensions without departing from the spirit and scope of the present invention.

In summary, the present invention is described above in terms of a preferred and other embodiments. The invention is not limited, however, to the embodiments described and depicted. Rather, the invention is limited only by the claims appended hereto.

What is claimed is:

1. An electrical feed-through for a gas discharge laser, the laser including first and second discharge-electrodes within a laser enclosure, the feed-through for conducting RF power from a source thereof without the enclosure, via an impedance-matching network, to the discharge electrodes, the feed-through comprising:

a hollow, metal feed-through body having first and second opposite ends, the first end intended to be without the enclosure and the second end intended to be within the enclosure;

a plate of an insulating material closing the second end of the feed-through body;

an elongated hollow tubular electrode extending through the feed-through body and through an aperture in the insulating-material plate the electrode being closed at the end thereof extending through the insulating-material plate; and a coolant-supply tube having an outside diameter smaller than the inside diameter of the electrode and extending coaxially into the electrode and terminating near the closed end thereof and wherein the electrode and coolant-supply tube are connected to a manifold arranged such that coolant fluid can be directed from the manifold through the coolant-supply tube and the end of the electrode and can return to the manifold via the space between the outer surface of the coolant-supply tube and the inner surface of electrode, said coolant fluid being in direct contact with the inner surface of the electrode.

2. The electrical feed-through of claim 1, wherein the feed-through body is cylindrical and has a circular flange at the first end thereof for attaching the feed-through to the enclosure.

3. The electrical feed-through of claim 1, wherein the impedance-matching network includes at least one capacitor, and wherein the capacitor is an integral part of the feed-through and includes, at the first end of the feed-though body, a plurality of capacitor plates including at least one metal plate and one insulating plate, each thereof having an aperture therein through which the electrode passes, with the plates being retained on the feed-through by a clamping device attached to the electrode.

4. The electrical feed-through of claim 3, wherein the capacitor includes two metal plates and two insulating plates arranged alternatively in series.

5. The electrical feed-through of claim 2, wherein the discharge-electrodes each have a groove along an edge thereof facing the feed-through and wherein there are first and second springably compressible connecting members attached respectively to the electrode and the feed-though body with the connection members and the discharge-electrode grooves being configured such that the first and second connection members are compressed to a push fit into the grooves in respectively the first and second discharge-electrodes and are retained in electrical contact with the electrode grooves by the spring compression of the connection members against sides of the grooves.

6. An electrical feed-through for a gas discharge laser, the laser including first and second discharge-electrodes within a laser enclosure, the feed-through for conducting RF power from a source thereof without the enclosure, via an impedance-matching network including art least one capacitor, to the electrodes, the feed-through comprising:

a hollow, metal feed-through body having first and second opposite ends, the first end intended to be without the enclosure and the second end intended to be within the enclosure;

a plate of an insulating material closing the second end of the feed-through body;

an elongated electrode extending through the feed-through body and through an aperture in the insulating-material plate; and wherein the discharge-electrodes each have an elongated groove along an edge thereof facing the feed-through and wherein there are first and second springably compressible connecting members attached respectively to the electrode and the feed-though body, each of said first and second springably compressible connecting members including two spaced apart parallel arrays of metal-spring fingers, with the connection members and the discharge-electrode grooves being configured such that the first and second connection members are compressed and slidably push fit into the elongated grooves in respectively the first and second discharge-electrodes and are retained in electrical contact with the electrode grooves by the spring compression of the connecting members against sides of the grooves.

7. The feed-through of claim 6, wherein the impedance-matching network capacitor is an integral part of the feed-though and wherein the integral capacitor includes a plurality of capacitor plates including at least one metal plate and one insulating plate, each thereof having an aperture therein through which the electrode passes, with the plates being retained on the feed-through at the first end of the feed-through body by a clamping device attached to the electrode.

8. The electrical feed-through of claim 7, wherein the capacitor includes two metal plates and two insulating plates arranged alternatively in series.

9. The electrical feed-through of claim 6, wherein the electrode is hollow and is closed at the end thereof extending through the insulating material plate and wherein the feed-through includes an arrangement for flowing a coolant fluid through the electrode.

10. An electrical feed-through for a gas discharge laser, the laser including first and second discharge-electrodes within a laser enclosure, the feed-through for conducting RF power from a source thereof without the enclosure, via an impedance-matching network, to the discharge electrodes, the feed-through comprising:

a hollow, metal feed-through body having first and second opposite ends, the first end intended to be without the enclosure and the second end intended to be within the enclosure;

a plate of an insulating material closing the second end of the feed-through body, the plate having first and second opposite surfaces, the first surface being on the side thereof without the enclosure and the second surface being on the side thereof within the enclosure and wherein the first surface includes a circular trench extending partially through the plate; and an elongated electrode extending through the feed-through body and through an aperture in the insulating-material plate.

* * * * *